United States Patent [19]

Anderson

[11] Patent Number: 5,007,819
[45] Date of Patent: Apr. 16, 1991

[54] DOUGH DISPENSER

[76] Inventor: Edward M. Anderson, 2620 E. Medicine Lake Dr., Plymouth, Minn. 55441

[21] Appl. No.: 180,390

[22] Filed: Apr. 12, 1988

[51] Int. Cl.⁵ .................... A21C 3/04; A21C 11/16
[52] U.S. Cl. .................... 425/184; 425/287; 425/288; 425/296; 425/310; 426/516; 426/518
[58] Field of Search ............ 425/238, 239, 240, 287, 425/288, 289, 292, 296, 308, 310, 381, 184; 426/503, 516, 518; 264/138, 142, 163

[56] References Cited

U.S. PATENT DOCUMENTS

| Re. 19,557 | 5/1935 | Baumann | 425/287 |
| 1,833,933 | 12/1931 | Carpenter | 425/288 |
| 2,669,949 | 2/1954 | Cottingham | 425/288 |
| 2,917,008 | 12/1959 | Kipnis | 425/381 |
| 2,974,614 | 3/1961 | Buck et al. | 425/288 |
| 3,023,715 | 3/1962 | Gilmore | 425/288 |
| 4,578,027 | 3/1986 | Koppa et al. | 425/298 |
| 4,659,303 | 4/1987 | Straka et al. | 425/381 |

FOREIGN PATENT DOCUMENTS 1179163 10/1964 Fed. Rep. of Germany ...... 425/287

*Primary Examiner*—Jay H. Woo
*Assistant Examiner*—C. Scott Bushey
*Attorney, Agent, or Firm*—Henry C. Kovar

[57] ABSTRACT

A dough dispenser for donuts, donut holes, fritters and so forth has a frame and dispensing hopper with a novel quick change hopper lock, a novel piston and adjustable dispensing valve for donut holes, and a novel structure for quick change of different sets of dispensing pistons and cutter dies.

19 Claims, 2 Drawing Sheets

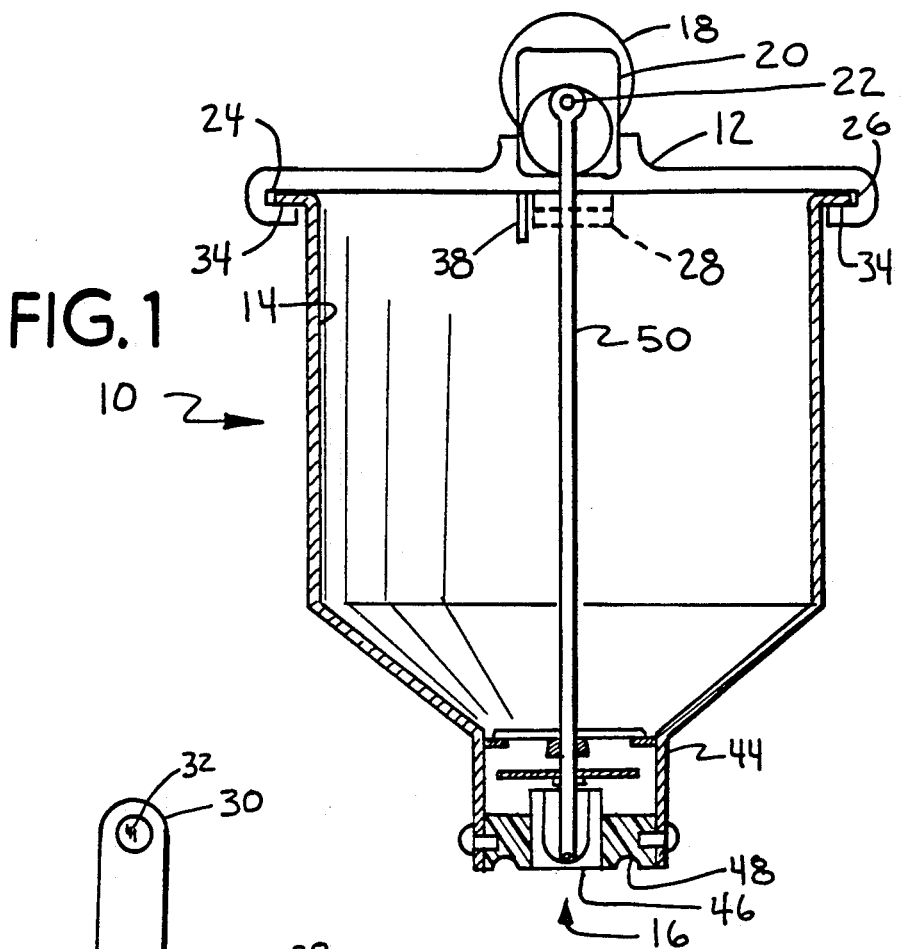
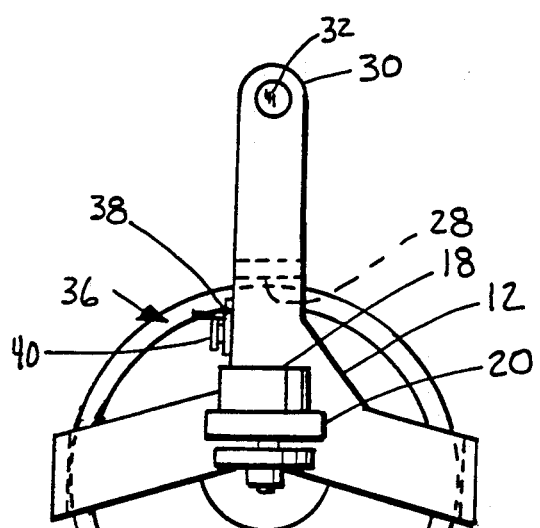
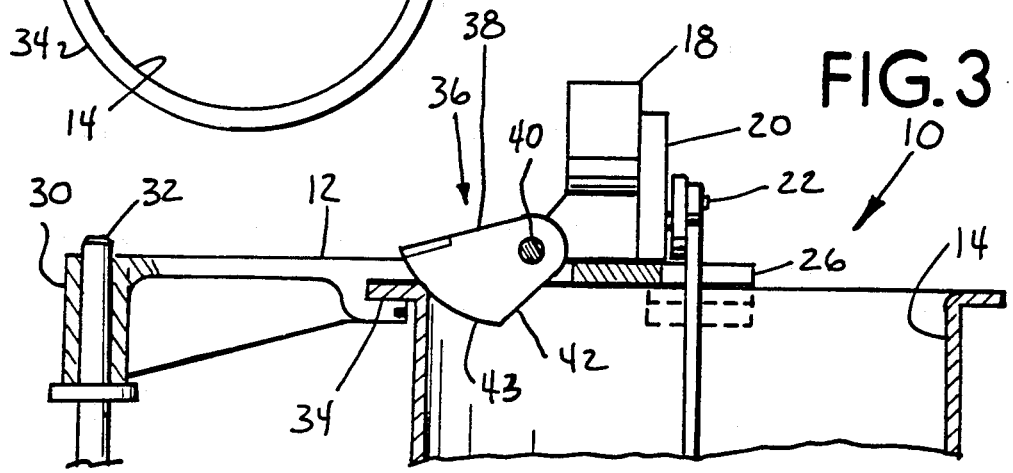
FIG.1
FIG.2
FIG.3

DOUGH DISPENSER

BACKGROUND OF THE INVENTION

1. Field of the Invention

This invention pertains to a dough dispenser, for dispensing fluid doughs for pastries and other food products.

2. The Prior Art

The prior art in dough dispensers typically dedicates the dispenser to one specific size and shape of pastry form. A specific example, there are large donuts, standard donuts, mini donuts, donut holes, bismarks, and so forth. There is no single dispenser that will do all of these.

Installation and removal of dough dispensers to and from the frying equipment has always been a problem. These dispensers need to be washed and sanitized with regularity.

Mechanism or structures have not been provided for quick changing of the dough cutting piston and cutter die, and there has not been an adjustable mechanism for varying the size of a dispensed piece of dough.

OBJECTS OF THE INVENTION

It is an object of the present invention to provide a dough dispenser having improved structure for dispensing solid pieces of dough, such as donut holes, fritters and Greek loukoumathes and the like that do not have a central aperture.

It is an object of the present invention to provide a dough dispenser having structure for quick change of a dough hopper.

It is an object of the present invention to provide a dough dispenser with easily changable dispensing pistons and cutters.

SUMMARY OF THE INVENTION

A dough dispenser has a dough hopper, a dough outlet from the hopper, a piston in the outlet, a piston drive structure, and a dough dispensing port through one side of the piston.

A dough dispenser has a frame with C-shaped tracks, a motor and gearbox, a dough hopper with a flange, a piston in the hopper and connectible to the gearbox, and a pivotable cam lock that self opens and latches the hopper into the frame upon insertion of the hopper.

A dough dispenser has a hopper, a motor and gearbox, a dispensing piston on a drive rod extending from the gearbox, a removable toroidal cutter die in the hopper and semi-permanent fasteners retaining the die to the hopper.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is an elevational view in section of the preferred embodiment of a dough dispenser according to the present invention;

FIG. 2 is a top plan view of the structure of FIG. 1; and

FIG. 3 is a side elevational view of the structure of FIG. 1;

DESCRIPTION OF THE PREFERRED EMBODIMENT

Figure 4:
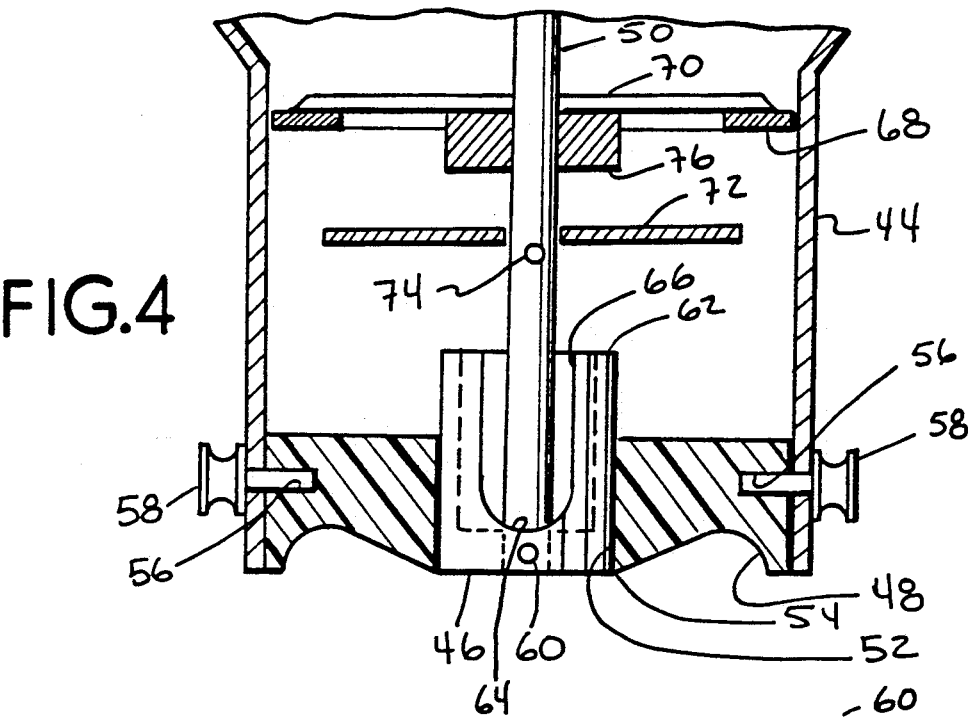
FIG. 4 is a detail elevational section view of one dough piston and cutter.

The present invention is particularily useful when embodied in a dough dispenser such as is shown in FIGS. 1-6 and which is generally indicated by the numeral 10. The dispenser 10 has a frame 12, a dough hopper 14, a dispensing piston and cutter generally indicated by the numeral 16.

The frame 12, as seen from above in FIG. 2, is a generally T-shaped structure on which an electric motor 18, reduction gearbox 20 and eccentric drive 22 are mounted. The frame 10 has a pair of opposed general C-shaped tracks 24, 26 which have their open sides facing each other as best shown in FIG. 1. A third C-shaped track 28 in the rear of the frame 12 and on the base by the T-shape faces toward the first and second tracks 24, 26. At the very rear of frame 12 and at the extremity of the base leg of the T-shaped frame 12 is an elongate journal 30 pivotally mounted upon a pedestal 32. The pedestal 32 is fixed upon a fryer (not shown) and provides a swing mount for the dispenser 10. The dispenser 10 can then be swung in over the fryer and back away from the fryer. The three tracks 24, 26, 28 are approximately 90 degrees from each other as measured from the centerline of the hopper 14. The hopper 14 has an upper and outward extending annular flange 34 that slides into and through the first and second tracks 24, 26 and then into the third track 28 for 3 point suspension of the hopper 14. A self actuating and self locking hopper lock, generally indicated by the numeral 36, is mounted on the base leg of the T-shaped frame 12 adjacent the third track 28. The lock 16 has a movable lock latch 38 pivotally mounted upon a fulcrum pin 40. The pin 40 is mounted above the hopper annular flange 34 so that the hopper 14 can be slid into the tracks 24, 26, 28 underneath the pin 40 and latch 38. The latch 38 has a leading ramp 42 that is engaged by the annular flange 34 upon insertion of the hopper 14 into the frame 12. The ramp 42 lifts the latch 38 up and over the annular flange 34. When the flange 34 has been received in the third track 28 and the flange 34 has gone past the ramp 42, the latch 38 drops down inside of the flange 34, and locks the hopper 14 in the frame 12. The latch 38 has a rearward facing lock abutment 43 which lockingly engages the inside of the hopper 14 and the flange 34. The preferrable surface on the lock abutment 43 is a gradually increasing radius cam which very tightly wedge locks the hopper 14 into and against the third track 28. The latch 38 is self actuating and self locking when the hopper 14 is pushed in. When the hopper 14 is to be removed, the latch 38 is manually pulled up and the hopper 14 pulled out of the frame 12.

In the bottom of the hopper 14 is a lower tubular dispensing section 44 having a dough dispensing piston 46 and a dough cutter 48. A piston drive rod 50 extends up through the hopper 14 and connects the eccentric 22 to the piston 46. The connection of the drive rod 50 to the eccentric 22 is a slip-on-slip-off quick connection enabling the drive rod 50 to be easily connected when the hopper 14 is placed in the frame 12 and to be easily removed when the hopper 14 is removed from the frame 12.

Figure 5:
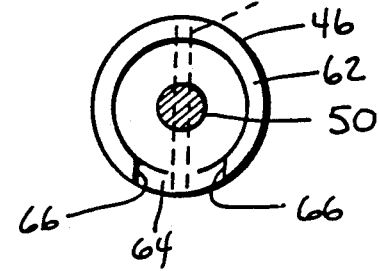
FIG. 5 is a view through lines V—V of FIG. 4.

A first piston 46 and cutter 48 is shown in FIGS. 4 and 5. This specific piston 46 and cutter 48 is for pastries without a center aperture, i.e. donut holes, fritters and Greek loukoumathes. The cutter 48 is a polytetrafluoroethylene plastic toroid having a central dispensing aperture 52, a sharp cutting edge 54 and a plurality of apertures 56 into which frictionally retained fastener pins 58 are inserted.

The piston 46 also of solid polytetrafluoroethylene is retained to the drive rod 50 by a removable piston pin 60. The piston 46 has a hollow skirt 62 extending upward into the hopper 14. A dispensing port 64 is cut out the side of the piston 46 and through the skirt 62. The dispensing port 64 is the void between the arcuate ends 66 of the skirt 62. Above the piston 46 is an annular bi-valve ring 68 fixed to the drive rod 50 by a spider 70. Below the annular ring 68 is a bi-valve disc 72 loosely fitted on the drive rod 50 and held up by a valve support 74. Between the spider 70 and bi-valve disc 72 is an adjustable length bi-valve stop 76. The stroke of the drive rod 50 is constant and the height of the valve stop 76 is adjusted to dispense more or less dough. A short valve stop 76 dispenses more dough and a long stop 76 dispenses less dough per cycle of the piston 46 when the dispensing port 64 is lowered out of the dispensing aperture 52.

Figure 6:
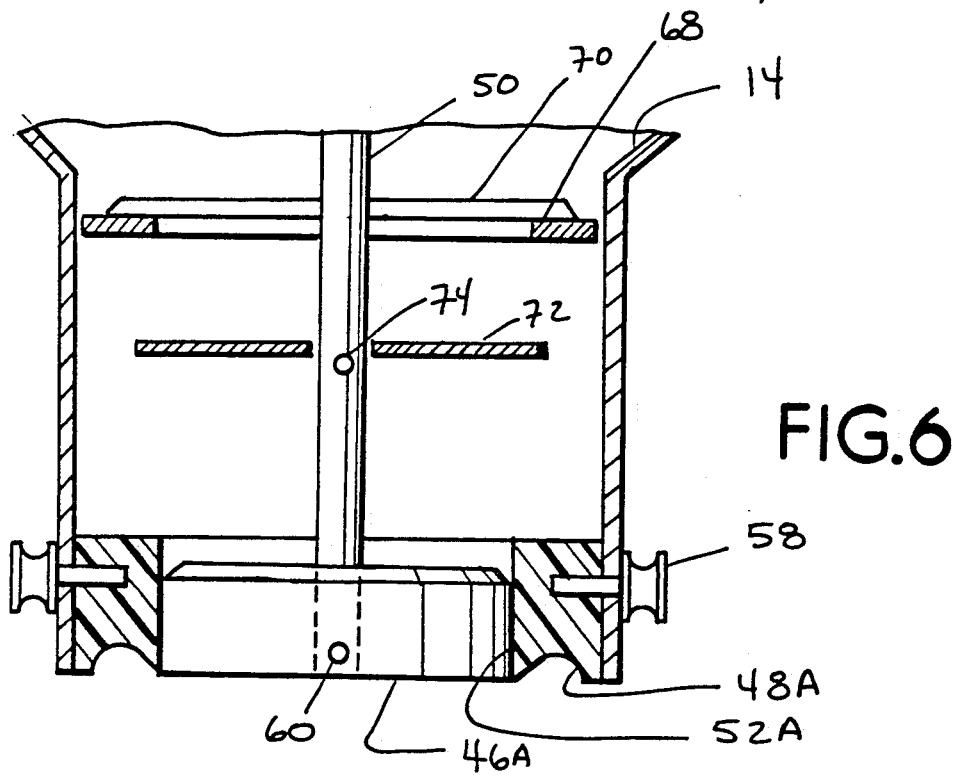
FIG. 6 is a detail elevational sectional view of a second dough piston and cutter.

A second piston 46A and cutter 48A is shown in FIG. 6 in the same hopper 14. The drive rod 50 has the same valve ring 68, spider 70 and valve support 74 and bi-valve disc 72. There is no bi-valve stop 76 and in FIG. 6, the bi-valve disc 72 engages and shuts off against the valve ring 68 during a dispensing cycle. A larger diameter full skirted piston 46A is matched with the larger diameter dispensing aperture 52A of an alternative cutter die 48A. The alternative cutter die 48A is fastened and held in the dispensing section 44 by the same fastener pins 58.

The matched sets of piston and cutter 46, 48 and 46A, 48A and other such pistons and cutters, may be quickly and easily changed in a given hopper 14. The piston 46A and cutter die 48A of FIG. 6 dispense a donut with a central aperture.

Although other advantages may be found and realized and various modifications may be suggested by those versed in the art, it should be understood that I wish to embody within the scope of the patent warranted hereon, all such embodiments as reasonably and proerly come within the scope of my contribution to the art.

I claim as my invention:

1. A dough dispenser, comprising
   (a) a dough hopper;
   (b) a removable cutter defining a dough outlet of said hopper;
   (c) a reciprocable piston in and normally closing said outlet;
   (d) piston drive means connected to said piston for moving the piston along its length within this said outlet; said drive means moving a stroke which is less than a height of said piston;
   (e) a dough dispensing port in and through one radial side of the piston, said port being movable from a normal closed position within the outlet to an alternative dispensing position which is at least in part out of the outlet; and
   (f) in which at least a portion of said piston is always within said outlet.

2. The dispenser of claim 1 in which said dispensing port has a circumferential extent of less than 180 degrees.

3. The dispenser of claim 1, in which said piston has a diametrically incomplete hollow cylindrical skirt extending upward and facing into the hopper, said dispensing port being a void between generally upright arcuate ends of the skirt.

4. The dispenser of claim 1, including a mechanical dough pushing means above said piston and co-movably mounted on and connected to a single said piston drive means, for pushing dough through said piston port.

5. The dispenser of claim 4, in which said pushing means is normally open and includes adjustment means on said drive means and above said pushing means for adjusting the relative opening of said pushing means during a dispensing stroke of the piston and said pushing means.

6. The dispenser of claim 1, in which said piston and said outlet are both polytetrafluoroethylene plastic, said drive means including a vertical rod in the hopper and connected below the dispensing port to the piston.

7. The dispenser of claim 4, including first removable fasteners retaining said dough cutter in the hopper, and second removable fasteners retaining said piston and said dough pushing means to said single drive means.

8. The dispenser of claim 7, in which said first fasteners comprise a plurality of pins extending through said hopper and into said removable cutter having said dough outlet therein, and in which said second fasteners include a cross pin through a head of said piston and through said drive means.

9. A dough dispenser, comprising
   (a) a frame having an opposed spaced apart pair of co-planar C-shaped tracks, the open ends of the C-shaped tracks facing toward each other;
   (b) a motor and gearbox fixed to said frame and an eccentric output drive on an output end of the gearbox;
   (c) a cylindrical dough hopper having an annular flange adjacent the top of the hoper, said hopper being a slip fit between said tracks and said flange being a slidable slip fit in said tracks;
   (d) a dough dispensing valve in an outlet of the hopper, and a valve drive rod having one end connected to the valve and a second end connected to the eccentric drive;
   (e) a pivotable lock latch mounted on said frame and above the hopper and retaining said hopper in said tracks, said latch having a leading cam ramp engageable by the flange upon sliding insertion of the hopper into the frame and into the tracks, and a lock abutment wedged against the inside of the hopper when the hopper has been completely received by said tracks;
   (f) a frame abutment holding the slidable hopper against said lock abutment; and
   (g) means on said output drive and said drive rod second end for selectively connecting and disconnecting the drive rod from the output drive during installation or removal of the hopper.

10. A dough dispenser according to claim 9, in which said frame has three said tracks with the open ends of the three C-shaped tracks facing toward and converging generally upon a centerline of the hopper.

11. A dough dispenser according to claim 9, in which the cam latch is mounted adjacent to a centrally located said frame abutment, said abutment being inbetween said C-shaped tracks and being spaced transversely therefrom.

12. A dough dispenser according to claim 9, in which said motor is fixedly mounted to said frame, and said valve rod one end and said eccentric output drive have an easily disconnectible horizontal single pin and clevis drive connection therebetween enabling sliding of the hopper together with said valve and valve drive rod therein, away from the motor and gearbox and out of the frame, for separation or adjoining of the hopper from or to the frame and gearbox without opening the valve.

13. A dough dispenser according to claim 12, in which said drive connection is above a level of the tracks.

14. A dough dispenser according to claim 9, in which said latch is mounted on a pivot pin, said pivot pin being above a level of the tracks.

15. A dough dispenser comprising
(a) a hopper having an upper vat and a lower tubular dispensing section;
(b) a motor and gearbox atop the hopper, said gearbox being operatively connected to a fixed stroke output drive having a single drive rod;
(c) a first dispensing piston in the dispensing section, said first piston being removably fastened on to said drive rod, said drive rod extending down through the hopper from the fixed stroke drive to the piston;
(d) a first removable toroidal dispensing cutter die in the dispensing section, said first die being matched to and surrounding said piston;
(e) a plurality of outwardly retractable fasteners extending through said hopper and into said dispensing section and said first die, for retaining and fixing said first die in the hopper dispensing section;
(f) a matched second pair of a second such piston and second such die, said second piston and second die being of a different dispensing diameter size, said matched second pair being interchangeably fastenable to the single drive rod and hopper with said fasteners;
(g) a dough dispensing bi-valve mounted on said single drive rod atop of said piston and in said dispensing section; and
(h) means on said single drive rod for adjusting said bi-valve for varying the volume of dough dispensed in a single fixed length stroke of either of said pistons.

16. A dough dispenser according to claim 15, in which said pistons and said dies are solid polytetrafluoroethylene plastic material.

17. A dough dispenser according to claim 15, in which said bi-valve includes a spider on the drive rod and in the dispensing section, a valve ring on said spider, and a valve disc floppy mounted on the drive rod between said fixed piston and said spider, and in which said bi-valve adjusting means is located in between said spider and said valve disc.

18. A dough dispenser comprising
(a) a dough hopper having an upper vat section and a lower outlet section;
(b) a dough dispensing structure in said outlet section, said dispensing structure including a fixed member and a movable member which is reciprocable with respect to the fixed member for alternatively opening and closing the outlet section;
(c) motive means atop of the vat section for reciprocating said movable member;
(d) a single upright drive rod in said hopper and operatively connecting said motive means to said movable member;
(e) a member operatively connected to said single drive rod, for pushing dough downward said member being above said movable member;
(f) means associated with said drive rod for changing said movable member from a first said movable member to an alternative said movable member; and
(g) means on said drive rod for adjusting the dough pushing rate of said member upon changing of said movable member, whereby said movable member and said member are commonly co-drivable in a single stroke by said single drive rod.

19. A dough dispenser according to claim 18, in which said member includes an annular bi-valve ring fixed to said drive rod, a bi-valve disc movably mounted on said rod below said ring, and in which said adjusting means is positioned between said ring and said disc.

* * * * *